3,078,241
SULFONATED VINYL AROMATIC HYDROCARBON-MALEIC ANHYDRIDE COPOLYMER COMPOSITION AND USE AS A SOIL CONDITIONER
Billy B. Hibbard and Arthur S. Teot, Midland, Mich., assignors to The Dow Chemical Company, Midland, Mich., a corporation of Delaware
No Drawing. Filed Apr. 3, 1958, Ser. No. 726,053
6 Claims. (Cl. 260—17.4)

This invention is concerned with the improvement of soil structure and is particularly directed to a method for improving the structure of soil and to certain novel compositions adapted for use in such method.

In recent years, a number of water-soluble polymers containing a plurality of polar groups have been proposed for use as soil conditioning agents. Such agents are intended to assist in altering the structure of the soil to produce a soil having a good crumb structure and thereby to avoid undesirable conditions such as puddling, crusting and the formation of hardpans. One agent which has been suggested for such use is the copolymer obtained by copolymerization of styrene and maleic anhydride. In actual practice, however, it has been found that although the styrene-maleic anhydride copolymers are highly effective in aiding the formation in the soil of water-stable aggregates, a serious disadvantage of such coplymers has remained unsolved, namely, that if, after the formation of water-stable aggregates, the soil dries, thereafter the soil aggregates stabilized by the styrene-maleic anhydride copolymer are frequently water repellent and fail to absorb the normal amount of water from subsequent rainfall or irrigation.

It is an object of the present invention to provide an improved method for conditioning soil. It is a further object of the invention to provide a method for facilitating the formation of water-stable aggregates in the soil without rendering such aggregates water repellant. Yet another object of the invention is to provide a novel composition for use in the method of the invention. Other objects will become apparent from the following specification and claims.

In accordance with the present invention, it has been discovered that high molecular weight (vinyl-aromatic hydrocarbon)-maleic anhydride copolymer sulfonates when incorporated in soils of poor physical structure cause marked improvement in the structure and workability of the soil. It has further been discovered that certain of said sulfonates, namely sulfonates of vinyltoluene-maleic anhydride copolymers having molecular weight of at least about 1,000,000 are particularly beneficial in improving soil structure. It is among the advantages of the invention that soils treated with the copolymer sulfonates develop a high proportion of relatively water-stable aggregates and remain crumbly and friable even at high moisture contents. It is a further advantage that the agents employed in the present invention confer on soil the desired improvement in aeration and water-holding capacity as well as accomplishing an increase in rate of percolation of rainfall or applied water into and through the soil without rendering the soil aggregates water repellent.

The (vinyl-aromatic hydrocarbon)-maleic anhydride copolymer sulfonates employed in accordance with the present invention are characterized by high molecular weights. Suitable copolymer sulfonates have molecular weights of at least about 200,000 and preferably of at least 1,000,000. The terms "(vinyl-aromatic hydrocarbon)-maleic anhydride copolymer sulfonates" and "copolymer sulfonates" as hereinafter employed in the specification and claims refer to the unhydrolyzed (vinyl-aromatic hydrocarbon)-maleic anhydride copolymer sulfonates which are capable of being hydrolyzed by soil moisture to produce water-soluble polymeric agents and also to the water-soluble sulfonates in which the anhydride bonds have been hydrolyzed to produce the carboxylic acid salt form by the use of an alkaline agent such as ammonium hydroxide, an alkali metal hydroxide or an alkaline earth metal hydroxide. The term "(vinyl-aromatic hydrocarbon)-maleic anhydride copolymer" as employed in the present specification and claims is inclusive of copolymers of styrene, vinyl toluene or vinyl xylenes with maleic anhydride. Such copolymers, employed as starting materials for preparing the sulfonates of the present invention, may be prepared by known methods, as described, for example, in U.S. Patent 2,286,062. The preferred high molecular weight (vinyl-aromatic hydrocarbon)-maleic anhydride copolymers, employed as starting materials for preparing sulfonates of the present invention, are described and claimed in a copending application by Billy B. Hibbard, Serial No. 584,165, filed May 11, 1956. The copolymer sulfonates prepared by sulfonation of vinyltoluene-maleic anhydride copolymers having molecuflar weights of at least 1,000,000 have been found to be particularly beneficial in improving soil structure and such novel copolymer sulfonates constitute a preferred embodiment of the invention.

The copolymer sulfonates employed in the invention are characterized by a degree of sulfonation of from about 25 to 90 percent. By "degree of sulfonation" is meant the percentage of the total benzene rings in the copolymer sulfonate which bear a sulfonic acid or sulfonate group. This range in degree of sulfonation corresponds to a sulfur content of the finished copolymer sulfonate of from about 3 to about 10 percent by weight. When the copolymer sulfonate is prepared from (vinyl-aromatic hydrocarbon)-maleic anhydride copolymers having molecular weights of from 200,000 to about 500,000, it is generally desirable to attain a degree of sulfonation such that the copolymer sulfonates contain from about 5.5 to 9 percent by weight of sulfur. With copolymer sulfonates prepared from copolymers having molecular weights of 1,000,000 or more, good results have been obtained with degrees of sulfonation corresponding to sulfur contents of from about 3.5 to 9 percent by weight.

The copolymer sulfonates employed in the invention may be produced by reacting a suitable (vinyl-aromatic hydrocarbon)-maleic anhydride copolymer with sulfur trioxide, chlorosulfonic acid or concentrated sulfuric acid. In one method of preparation of the desired sulfonates, a (vinyl-aromatic hydrocarbon)-maleic anhydride copolymer having a molecular weight of at least about 200,000 is dispersed in finely divided form in an inert chlorinated hydrocarbon such as methylene chloride or perchloroethylene to form a slurry preferably containing from about 0.5 to 5 percent by weight of the copolymer. To the resulting slurry a solution containing from about 0.5 to 5 percent by weight of freshly prepared sulfur trioxide in the chlorinated hydrocarbon solvent is added with stirring at a temperature of from 0° C. up to the boiling point of the solvent employed. The addition is made quite rapidly over a period of from 1 to 50 minutes and the reaction mixture thereafter maintained at a temperature in the reaction range, with stirring, for a period of from several minutes to several hours to complete the reaction. Thereafter the sulfonate product may be separated by conventional procedures such as filtration, washing with solvents and drying.

In the sulfonation procedure, it is generally desirable to adjust the concentrations and amounts of reactants so that the final reaction mixture contains no more than about 4 percent by weight of total solids, that is, of copolymer and sulfur trioxide taken together. Good results have been obtained in the sulfonation of styrene-maleic anhydride copolymers when employing at least 1 mole and preferably from about 1.2 and 2 moles of sulfur dioxide per mole of styrene combined in the starting copolymer. With copolymers of maleic anhydride and vinyltoluene or vinylxylene, particularly with such copolymers having molecular weights in excess of 500,000, sulfonate products having desirable properties are obtained when employing from about 0.5 to about 1 mole of sulfur trioxide per mole of combined vinyl-(aromatic) hydrocarbon in the copolymer.

The copolymer sulfonates are, in general, separated by filtration from the reaction medium in the free sulfonic acid form and with the major portion of the moieties derived from the maleic anhydride remaining in the anhydride form. Such products may be employed directly in the practice of the invention, however, it is generally desirable to accomplish further purification of the crude sulfonate product and/or to convert such product to the salt form. The crude copolymer sulfonates may be freed of excess sulfur trioxide by extraction with a suitable solvent such as diethyl ether. Such purified products or the crude reaction product may be converted to the salt form by dispersing such product in an aqueous solution of an alkaline agent such as ammonium hydroxide, an alkali metal hydroxide or an alkaline earth metal hydroxide to convert the sulfonate groups into the corresponding ammonium, alkali metal or alkaline earth metal salts, respectively, and to hydrolyze the anhydride linkages to the corresponding carboxylate salts. The resulting salt forms of the copolymer sulfonates are water-soluble. In such preparation of salts of the copolymer sulfonates, the hydrolysis of the anhydride linkages proceeds relatively slowly accompanied by neutralization of the alkaline agent and it is generally preferred to supply the alkaline agent in several increments to maintain the pH of the dispersion or solution of copolymer sulfonate in the range of 8 to 12. The use of the copolymer sulfonates in the salt form is preferred and the use of an aqueous solution of copolymer sulfonate in salt form at a pH of 9 to 12 constitutes a preferred embodiment of the invention.

In carrying out the invention, the copolymer sulfonate is intimately dispersed through the desired depth of soil. In one method of operation, a water-soluble salt of the copolymer sulfonate is dissolved in water and the solution sprayed over the surface of the freshly fitted soil. Alternatively, where surface irrigation is used, the water-soluble salt of the copolymer sulfonate may be dissolved in the irrigation water and be carried thereby over and into the soil to be treated. In yet another mode of operation, the dry copolymer sulfonate either in the acid anhydride or in the salt form is reduced to a finely divided condition and dusted or drilled on or into the upper layers of the soil. In the latter operation, it is frequently convenient to admix the dry copolymer sulfonate with a finely divided carrier such as clay, diatomaceous earth, volcanic ash and the like to aid in its dispersal on and into the soil. In any case, it is desirable that the application be followed as soon as possible by discing or harrowing and dragging operations in order to accomplish the uniform distribution of the copolymer sulfonate to the desired depth in the soil. In such operations, it is frequently preferred to distribute the sulfonate through the upper 3 to 6 inches of the soil. However, depending upon the characteristics of the soil and the particular result desired, greater or less depths of soil may be treated.

In still another mode of operation, the copolymer sulfonate may be applied to a relatively thin cross-section of the soil. Thus, for example, where the primary concern is to assist in the emergence of a crop in a soil normally tending to form a hard crust, a surface application, treating only the upper ¼ to 1 inch of soil, is employed. Similarly where the problem is one of subsurface impermeability, as where plow-sole hardpans occur, the copolymer sulfonate may be distributed in the bottom of the furrow immediately following the plow to improve the structure in the cross-section of the soil where the problem occurs.

The amount of copolymer sulfonate employed will vary depending on the particular purpose to be accomplished and the type of soil under treatment. In general, it is only necessary that sufficient of the copolymer sulfonate be employed to accomplish the desired result as regards increased formation of water-stable aggregates and improvement in soil structure. Good results have been obtained when employing the sulfonates in amounts of from about 0.01 to 0.5 percent by weight of the soil treated.

For use in the above procedures, the copolymer sulfonates may be intimately dispersed on finely divided solid carriers to provide dust compositions. In preparing such compositions, the dried sulfonate may be mechanically mixed with one or more of the carriers and ground in a hammermill or the like. Alternatively, when employing copolymer sulfonates manufactured in finely powdered form, it suffices to mix such product intimately with the finely divided carrier. Suitable finely divided solid carriers include diatomaceous earth, expanded mica, volcanic ash, gypsum, talc, wood flour, inorganic fertilizer materials and clays such as bentonite, fuller's earth and kaolinite. In general, from about 5 to 75 percent and preferably from 20 to 40 percent by weight of the copolymer sulfonate is employed in such dust compositions.

The following examples illustrate the invention but are not to be construed as limiting the same.

EXAMPLE 1

A solution of 30 grams (0.37 mole) of sulfur trioxide in 570 grams of methylene chloride was added portionwise with stirring to a suspension of 30 grams of finely ground commercial styrene-maleic anhydride copolymer in 870 grams of methylene chloride. The copolymer had a molecular weight of about 230,000. The addition was carried out during a period of 50 minutes while maintaining the resulting mixture at a temperature of 40° C. Thereafter stirring was continued and the temperature of the reaction mixture maintained at 40° C. for a further 64 minutes to produce the desired styrene-maleic anhydride sulfonate product as a suspended solid in the reaction medium. The crude product was separated by filtration, washed repeatedly with diethyl ether to remove residual reaction medium and dried. The dried product contained 6.98 percent by weight of sulfur by analysis and was an amorphous solid substantially insoluble in cold water, slowly soluble in hot water and soluble in aqueous alkali metal hydroxide solution.

EXAMPLE 2

The styrene-maleic anhydride copolymer sulfonate of Example 1 was suspended in distilled water and sufficient aqueous sodium hydroxide solution added to convert the sulfonic acid groups to the sodium salt form and to convert a major proportion of the anhydride moieties to the corresponding carboxylic acid sodium salt form. The amount of polymer and water in the resulting solution was adjusted to provide 2 percent by weight of the copolymer sulfonate at a pH of 5. A portion of this 2 percent solution was diluted with water to produce 30 milliliters of aqueous solution containing 0.15 gram of the styrene-maleic anhydride copolymer sulfonate.

Miami silt loam soil, known to be subject to severe compaction and puddling in the field, was air-dried and sieved through a 10 mesh screen. A 300 gram portion of the dry sieved soil was mixed with the 30 milliliters of above-described copolymer sulfonate solution to provide a mixture containing 0.05 percent by weight of the copolymer sulfonate in the soil. The treated soil was then placed in a standard soil tube having a 1.87 inch inside diameter and gently tamped to obtain a soil column 6 inches in height. A 300 gram portion of the untreated, dry, sieved soil was mixed with 30 milliliters of distilled water and placed in a similar tube to serve as a check. The columns so prepared were wetted to saturation and allowed to stand for 72 hours. Thereafter a small constant head of water was maintained over the soil columns for a period of 8 hours and the rate of percolation of water through the soil was determined. It was found that the water percolated through the treated column at an average rate of 3227 milliliters per hour while through the untreated soil column, an average percolation rate of only 16.5 milliliters per hour was obtained.

EXAMPLE 3

Upon completion of the percolation determination in Example 2, the soil samples were allowed to drain for 16 hours and removed from the tubes. A 200 gram portion of each of the wet soil samples was separately placed on a standard 14 mesh sieve (Tyler Sieve Series) superimposed on a 32 mesh sieve. The sieve combination was then agitated for a period of about 2 minutes in a tank of water until all of the fine non-aggregated soil was screened out. By this procedure, water-stable aggregates having diameters of 0.5 millimeter or greater were retained on the screens. These aggregates were allowed to drain for 5 minutes and then weighed. The percent by weight of wet water-stable aggregates based on the wet weight of soil employed was 41.0 percent for the treated soil as compared to 14.0 percent for the untreated soil.

EXAMPLE 4

Commercial styrene - maleic anhydride copolymer (SMA), having an average molecular weight of from 200,000 to 250,000, was sulfonated and the resulting sulfonate products separated, purified and analyzed according to the general procedure of Example 1. The amounts of reactants and solvent and reaction conditions employed are set forth in the following table together with the analyses of the products. The reaction temperature in all the sulfonations was 40° C.

Table I

| Sulfonate Product No. | Copolymer Dispersion | | $SO_3$ Solution | | Time for Addition of $SO_3$ Solution, Minutes | Reaction Time After Addition, Minutes | Sulfur Content of Product, Percent by Weight |
|---|---|---|---|---|---|---|---|
| | SMA, grams | $CH_2Cl_2$ grams | $SO_3$, grams | $CH_2Cl_2$, grams | | | |
| 1 | 22 | 557 | 10.5 | 339.5 | 25 | 132 | 3.34 |
| 2 | 44 | 1,114 | 21 | 679 | 25 | 24 | 6.04 |
| 3 | 44 | 1,114 | 21 | 679 | 5 | 72 | 6.92 |
| 4 | 44 | 1,114 | 21 | 679 | 5 | 6 | 5.83 |
| 5 | 44 | 1,114 | 21 | 679 | 1 | 60 | 7.29 |

Each of the products was an amorphous solid substantially insoluble in cold water, slowly soluble in hot water and soluble in aqueous alkali metal hydroxide solution.

EXAMPLE 5

The copolymer sulfonates of Example 4 were dissolved in aqueous sodium hydroxide solution and the resulting solutions tested in Miami silt loam for their effect on rate of percolation of water as in Example 2 and for the stabilization of soil aggregates as in Example 3. The copolymer sulfonates were applied to 300 grams of the soil in 30 milliliters of water containing 0.15 or 0.075 gram of copolymer sulfonate to supply said sulfonate in the amount of 0.05 or 0.025 percent by weight of the soil, respectively. The results are set forth in the following table in terms of the percentage increase in percolation rate and in percent by weight of water-stable aggregates over the corresponding values for checks on the same soil containing no copolymer sulfonate.

Table II

| Sulfonate product No. | Percent by Weight of Copolymer Sulfonate in Soil | Percentage Increase in Average Percolation Rate Over Check | Percentage Increase in Water-Stable Aggregates Over Check |
|---|---|---|---|
| 1 | 0.05 | 1,370 | 274 |
| 2 | 0.05 | 1,070 | 352 |
| 2 | 0.025 | 775 | 260 |
| 3 | 0.05 | 1,200 | 368 |
| 3 | 0.025 | 890 | 288 |
| 4 | 0.05 | 1,395 | 215 |
| 5 | 0.05 | 1,420 | 209 |

For the untreated check soil columns in the above determinations, the average percolation rates ranged from 50 to 90 milliliters per hour and the percent of water-stable aggregates ranged from 12.5 to 17 percent by weight.

EXAMPLE 6

Following the procedure of Example 1, sulfonates were prepared from styrene-maleic anhydride copolymers (SMA) having molecular weights of over 1,500,000. Typical reaction conditions and product analyses were as follows:

Table III

| Sulfonate Product No. | Copolymer Dispersion | | $SO_3$ Solution | | Time for Addition of $SO_3$ Solution, Minutes | Reaction Time After Addition, Minutes | Sulfur Content of Product, Percent by Weight |
|---|---|---|---|---|---|---|---|
| | SMA, grams | $CH_2Cl_2$, grams | $SO_3$, grams | $CH_2Cl_2$, grams | | | |
| 6 | 10.1 | 1,353 | 10.4 | 676.5 | 20 | 114 | 9.67 |
| 7 | 20.2 | 2,000 | 8.0 | 792 | 10 | 120 | 7.55 |

Sulfonate Product No. 6 was prepared at a reaction temperature of 30° C. and Sulfonate Product No. 7 at a reaction temperature of 40° C.

EXAMPLE 7

A portion of Sulfonate Product No. 6 of Example 6 was dissolved in aqueous sodium hydroxide solution to produce a solution of the sodium salt form of the copolymer sulfonate. This solution was diluted and a portion of the dilute solution incorporated in Miami silt loam exactly as in Example 2. The percolation rate was then determined as in Example 2 and the percent of water-stable aggregates as in Example 3. The results are summarized in the following table.

| | Average Percolation Rate, Milliliters/Hour | Grams of Water-Stable Aggregates per 100 Grams of Soil |
|---|---|---|
| Treated soil | 804 | 60.5 |
| Untreated check | 44 | 15.0 |

Similar improvements in percolation rate and aggregation were obtained when the dry copolymer sulfonate was incorporated by thorough mixing in soil containing 10 percent moisture and the resulting mixture tested as in Examples 2 and 3.

EXAMPLE 8

The dry sodium salt form of a styrene-maleic anhydride copolymer sulfonate similar to Sulfonate Product No. 1 (Example 4) was mixed with bentonite and the mixture ground in a hammermill to produce a dry, finely-divided solid composition containing 50 percent by weight of the styrene-maleic anhydride copolymer sulfonate salt. This composition was dispersed in soil in an amount to provide 0.05 percent by weight of the copolymer sulfonate in the upper 3 inches of the soil. The treated soil was repeatedly watered and allowed to dry under conditions normally leading to severe crusting. The soil was contained in pots and similar pots of similarly treated Miami silt loam soil without addition of the copolymer sulfonate were employed as checks. After drying the soil samples, 500 milliliters of water was added to each pot. The treated soil absorbed the entire 500 milliliters of water in 60 seconds with no water running through the pot. The untreated check soil did not absorb the entire 500 milliliters of water in over 60 minutes. This test demonstrated that the soil treated with the copolymer sulfonate had excellent permeability to water with no waterproofing of the soil aggregates.

EXAMPLE 9

8.14 grams of a vinyltoluene-maleic anhydride copolymer having a molecular weight of about 3,200,000 was dispersed in 805 grams of methylene chloride and a solution of 5.96 grams of sulfur trioxide in 591 grams of methylene chloride was added thereto with stirring. The above addition was carried out over a period of about 10 minutes while the mixture was maintained at a temperature of 40° C. Following the addition of the sulfur trioxide solution, the reaction mixture was maintained at about 40° C. with stirring for a period of 2 hours. Thereafter the vinyltoluene-maleic anhydride copolymer sulfonate product was separated by filtration and freed of reaction medium by ether extraction as in Example 1. The product was an amorphous solid substantially insoluble in cold water and soluble in aqueous alkalis and containing 8.95 percent by weight of sulfur by analysis.

In an exactly similar fashion, a vinyltoluenemaleic anhydride copolymer having a molecular weight of 630,000 was sulfonated to produce a copolymer sulfonate product containing 7.02 percent by weight of combined sulfur.

EXAMPLE 10

A portion of the copolymer sulfonate from the copolymer of molecular weight of 3,200,000 of Example 9 was dissolved in aqueous sodium hydroxide solution to produce a 2 percent by weight solution of the sodium salt form of the copolymer sulfonate at a pH of 12. This solution was characterized by a viscosity of 955 centipoises as determined with a Brookfield viscometer. Portions of this solution were diluted to produce solutions containing 0.15, 0.075 and 0.0375 gram of copolymer sulfonate in 30 milliliters of solution. These solutions were applied to soil of poor structure by the method of Example 2 to produce treated soils containing 0.05, 0.025 and 0.0125 percent by weight of copolymer sulfonate, respectively. The percolation rate was then determined as in Example 2 and the percent water-stable aggregates as in Example 3 for each of the treated soils and for an untreated check. The results are summarized in the following table.

| Percent by Weight of Copolymer Sulfonate | Average Percolation Rate, Milliliters/ Hour | Percent of Water-Stable Aggregates |
|---|---|---|
| 0.05 | 1,160 | 55 |
| 0.025 | 790 | 49.5 |
| 0.0125 | 290 | 38 |
| Untreated check | 31 | 24 |

EXAMPLE 11

20.6 grams of a vinyltoluene-maleic anhydride copolymer having a molecular weight of 1,230,000 was dispersed in 2,040 grams of methylene chloride and a solution of 7.6 grams of sulfur trioxide in 752 grams of methylene chloride added thereto portionwise with stirring. The addition was carried out while maintaining the mixture at a temperature of about 40° C. and thereafter stirring was continued and the temperature maintained at about 40° C. for a period of 45 minutes. The resulting vinyltoluene-maleic anhydride copolymer sulfonate product was separated and purified as in Example 1 and found to contain 3.9 percent by weight of sulfur. A portion of the copolymer sulfonate product was suspended in water and dissolved by the addition of aqueous sodium hydroxide solution to produce a 2 percent by weight solution of the sodium salt form of the copolymer sulfonate having a pH of 8.9. This solution was characterized by a viscosity of 659 centipoises as determined with a Brookfield viscometer. When 0.05 percent by weight of the copolymer sulfonate in the sodium salt form was incorporated in a soil of poor structure, excellent improvements in aggregation and permeability of the soil were obtained.

EXAMPLE 12

A styrene-maleic anhydride copolymer sulfonate similar to that of Example 1 was mixed with bentonite and hammermilled to produce a finely divided composition containing 50 percent by weight of the copolymer sulfonate. This composition was applied to and mixed into the upper six inches of a silt loam soil of poor natural structure. The soil was dry at the time of application (June 4) so that thorough mixing was possible. The application was made at the rate of about 2000 pounds of composition per acre of surface to provide 0.05 percent by weight of copolymer sulfonate in the soil. The treated soil was exposed to the normal action of the elements in a farm area in Michigan and was cultivated periodically during the growing season. A further area of the untreated soil was similarly maintained and cultivated to serve as a check. After completion of the growing season (October 20) portions of the treated and untreated soils were removed and air-dried. The air-dry samples were sieved through a coarse screen to remove large lumps and debris. A 50 gram portion of each soil passed through the screen was placed on the top sieve of a nest of 5 sieves having openings of 4, 2, 1, 0.5 and 0.25 millimeters arranged in order of decreasing size. The nest of sieves was immersed in water and raised and lowered through the water through a distance of 1.5 inches at the rate of 30 strokes per minute for 30 minutes. The aggregates remaining on the sieves were dried and weighed. The percent by weight of water-stable aggregates greater than 0.25 millimeter in diameter was 52 percent for the treated soil and 28 percent for the untreated soil.

We claim:
1. A method for improving soil structure which comprises distributing through the soil and in intimate mixture therewith a sulfonate of a copolymer of maleic anhydride with a vinyl-aromatic hydrocarbon, selected from styrene, vinyltoluene and vinylxylenes, in amount of at least 0.01 percent by weight of the soil, said copolymer having a molecular weight of at least 200,000 and said sulfonate being selected from the group consisting of sulfonic acids and water-soluble salts thereof.

2. A composition for the treatment of soil which comprises a finely divided solid carrier and in intimate mixture therewith a sulfonate of a copolymer of maleic anhydride and a vinyl-aromatic hydrocarbon selected from styrene, vinyltoluene and vinylxylenes, said copolymer having a molecular weight of at least 200,000 and said sulfonate being selected from the group consisting of sulfonic acids and water-soluble salts thereof and being employed in the amount of from about 5 to 75 percent by weight of the composition.

3. A method according to claim 1 wherein the sulfonate is prepared from a copolymer having a molecular weight of at least 1,000,000.

4. A method according to claim 1 wherein the copolymer sulfonate is a sulfonate of a copolymer of styrene and maleic anhydride having a molecular weight of at least 1,000,000.

5. A method according to claim 1 wherein the copolymer sulfonate is a sulfonate of a copolymer of vinyltoluene and maleic anhydride, said copolymer having a molecular weight of at least 1,000,000.

6. A composition according to claim 2 which comprises a sulfonate of a copolymer of vinyltoluene and maleic anhydride, said copolymer having a molecular weight of at least 1,000,000.

References Cited in the file of this patent
UNITED STATES PATENTS

| | | |
|---|---|---|
| 2,475,886 | Goebel | July 12, 1949 |
| 2,625,529 | Hedrick et al. | Jan. 13, 1953 |
| 2,778,809 | Mussel et al. | Jan. 22, 1957 |
| 2,809,960 | Roth | Oct. 15, 1957 |
| 2,821,522 | Bauman et al. | Jan. 28, 1958 |
| 2,872,436 | Hibbard | Feb. 3, 1959 |